United States Patent [19]
Lott et al.

[11] Patent Number: 5,795,553
[45] Date of Patent: Aug. 18, 1998

[54] NITROGEN OXIDE ADSORBING MATERIAL

[75] Inventors: Stephen E. Lott, Edgewood; Timothy J. Gardner, Albuquerque; Linda I. McLaughlin, Albuquerque; John B. Oelfke, Albuquerque; Charlene A. Matlock, Albuquerque, all of N. Mex.

[73] Assignee: Low Emmissions Technologies Research and Development Partnership, Dearborn, Mich.

[21] Appl. No.: 675,063

[22] Filed: Jul. 3, 1996

[51] Int. Cl.$^6$ ............................................. B01J 8/00
[52] U.S. Cl. ....................... 423/213.2; 423/213.5; 423/239.1; 422/171; 422/177; 502/244; 502/345; 502/330; 502/331
[58] Field of Search ........................... 422/171, 177, 422/180, 189, 211, 222, 168; 423/213.2, 213.5, 239.1; 502/344–345, 349, 409, 242, 243, 244; 60/299, 301

[56] References Cited

U.S. PATENT DOCUMENTS

| | | | |
|---|---|---|---|
| 4,151,124 | 4/1979 | Gidaspow et al. | 423/213.5 |
| 4,511,455 | 4/1985 | Dosch et al. | 208/10 |
| 4,929,582 | 5/1990 | Dosch et al. | 502/11 |
| 5,041,270 | 8/1991 | Fujitani et al. | 423/213.2 |
| 5,433,074 | 7/1995 | Seto et al. | 60/301 |
| 5,433,933 | 7/1995 | Eshita et al. | 423/213.2 |
| 5,461,022 | 10/1995 | Dosch et al. | 502/11 |
| 5,589,432 | 12/1996 | Yoshida et al. | 423/213.2 |

OTHER PUBLICATIONS

T.-R. Vijava et al, Dry adsorption processes for removal of SOx & NOx in flue gas–a review, 5 Paperi ja Puu 401 (1986).

A. A. Siddiqi et al, NOx Controls in review, Hydrocarbon Processing, 115 (1981).

J.S. Feeley et al, Abatement of NOX from Driesel Engines, SAE Paper No. 950747, 1 (1995).

W. Zhang et al, removal of Nitrogen monoxide on Copper Ion–exchanged zeolites by pressure swing adsorption, American Chemical Society 1993.

H. Arastoopour et al, NOx Removal w/High–Capacity metal Oxides in the presence of oxygen, American Chemical Society, 223 (1981).

W.B. Li et al, Selective Adsorption of NOx from Hot Combustion gases by Ce–doped CuO/TiO$_2$, 11 Energy & Fuels 428 (1997).

K. Eguchi et al, Reversible Absorption of Nitrogen Oxides in Mn–Zr Oxide, 158 J. Catal. 420 (1996).

K.S. Yoo et al, Sulfation of Al$_2$O$_3$ in Flue gas Desulfurization by CuO/$\gamma$–Al$_2$O$_3$ Sorbent, 33 Ind. Eng. Chem. Res. 1786 (1994).

A.M. Rubel et al, Activated carbon for control of nitrogen oxide emissions, 10(3) J. of Mater. Res. 562 (1995).

T. Okuhara et al, Adsorption & Reduction of Nitrogen Monoxide by Potassium–doped Carbon, 82 J. Chem. Soc., Far. Trans. 1, 3657 (1986).

M. J. Illan–Gomez et al, NO reduction by activated carbons, 10[1] Energy Fuels 158 (1996).

R. Burch et al, The effect of promoters on Pt/Al$_2$O$_{n3}$ Catalysts for the reduction of NO by C$_3$H$_6$ under lean–burn conditions, 11 Appl. Catal. B. 207 (1997).

W. Bogner et al, Removal of nitrogen oxides from the exhaust of a lean–tune gasoline engine, 7 Appl. Catal. B 153 (1995).

N. Takahashi et al, The new concept of 3–way catalyst for automotive lean–burn engine, 27 Catalysis Today, 27 63 (1996).

H.S. Gandhi and M. Shelef, "The Adsorption of Nitric Oxide on Copper Oxides," 28 Journal of Catalysis 1 (1973).

*Primary Examiner*—Hien Tran
*Attorney, Agent, or Firm*—Harness, Dickey & Pierce, P.L.C.

[57] ABSTRACT

A material effective for adsorbing NO$_x$ from an exhaust stream of a combustion process, such as from an internal combustion engine operating under lean burn conditions, is disclosed. The material comprises an alkali metal-doped and copper-doped hydrous metal oxide material that has been calcined. The alkali metal is selected from potassium and sodium. The material is coated onto a substrate, such as ceramic beads or pellets, or a honeycomb cordierite monolith, and placed in contact with the exhaust stream.

25 Claims, 7 Drawing Sheets

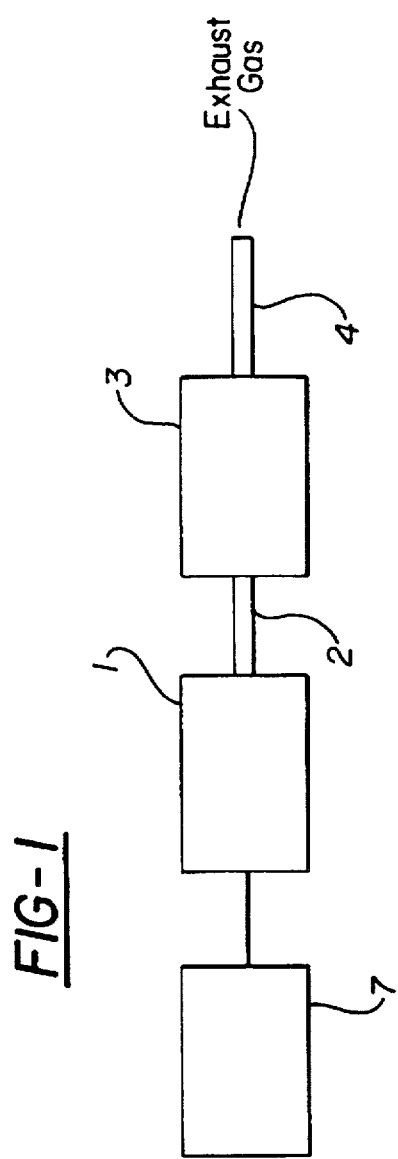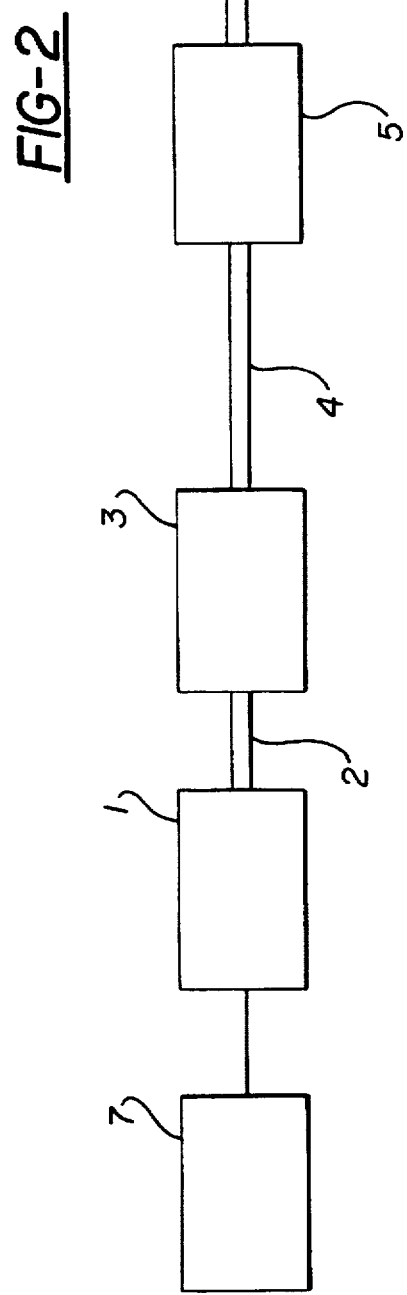

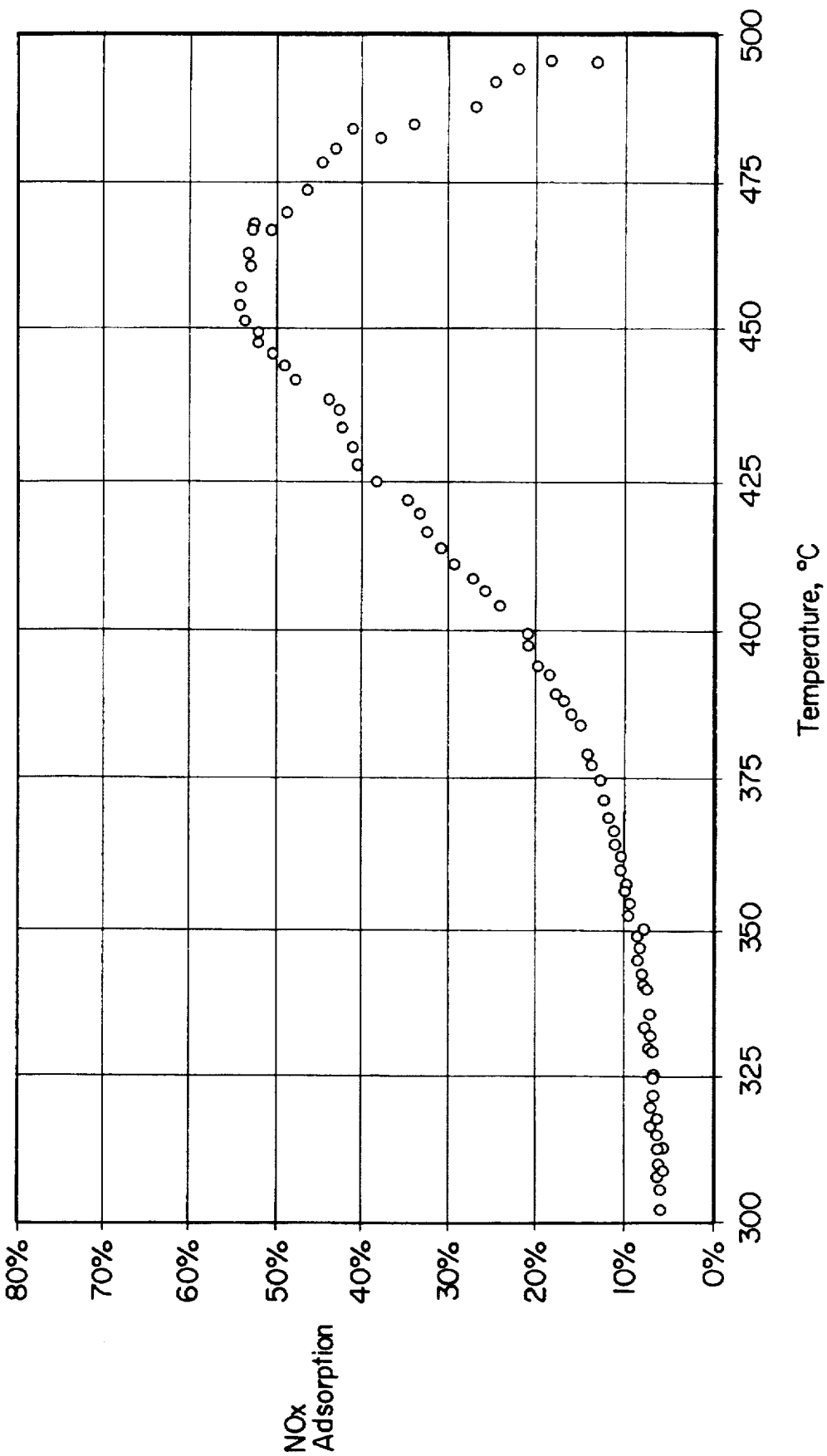

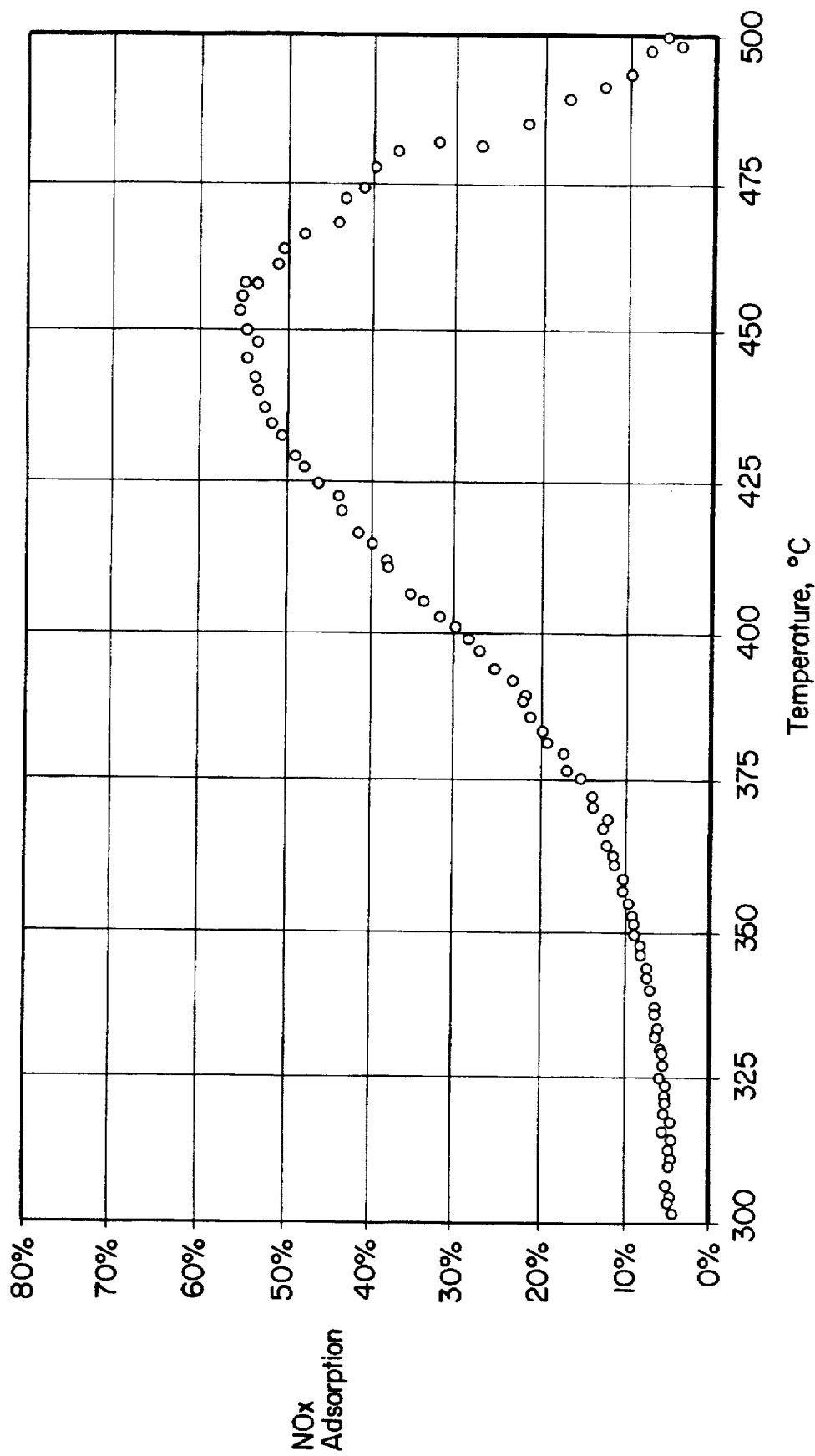

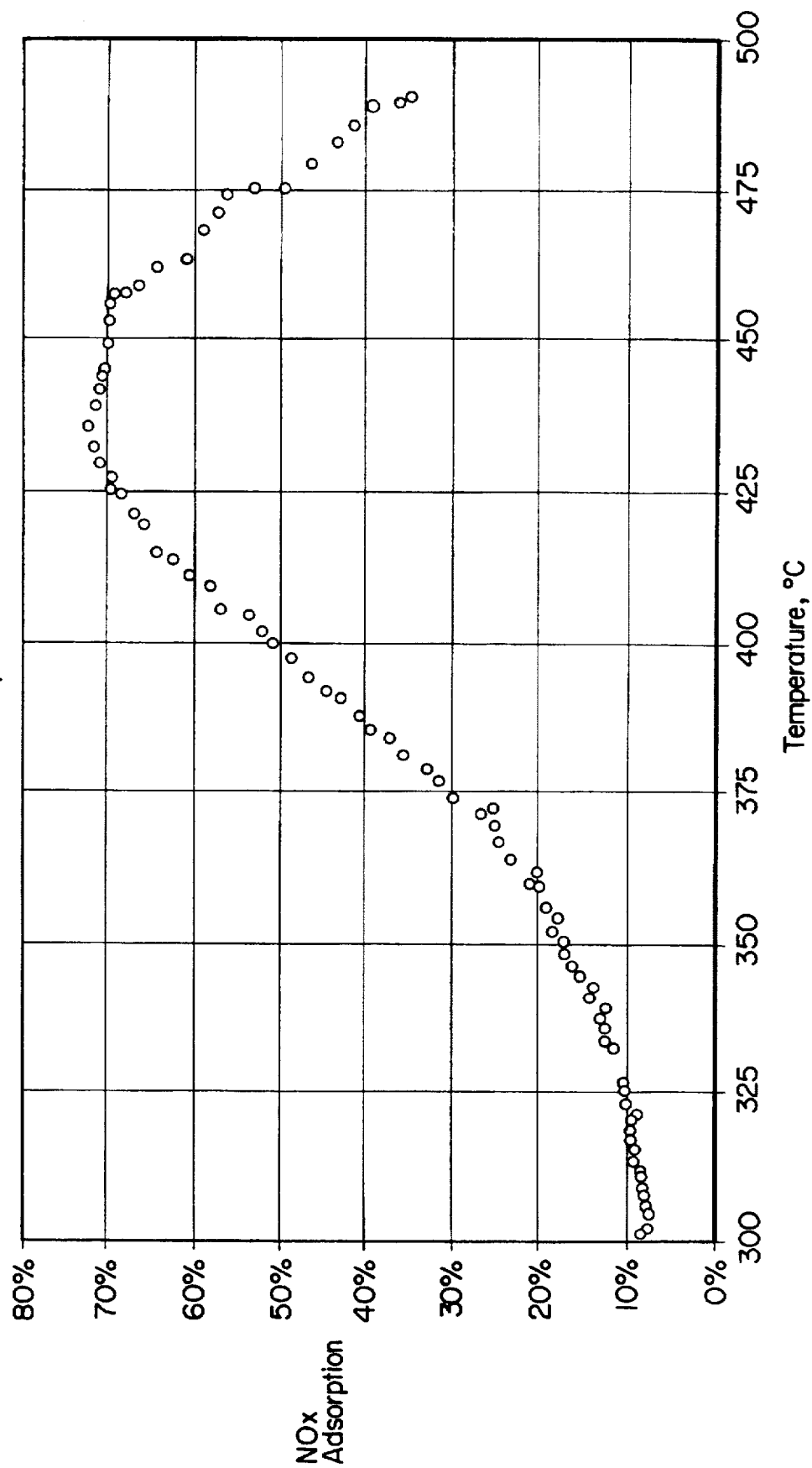

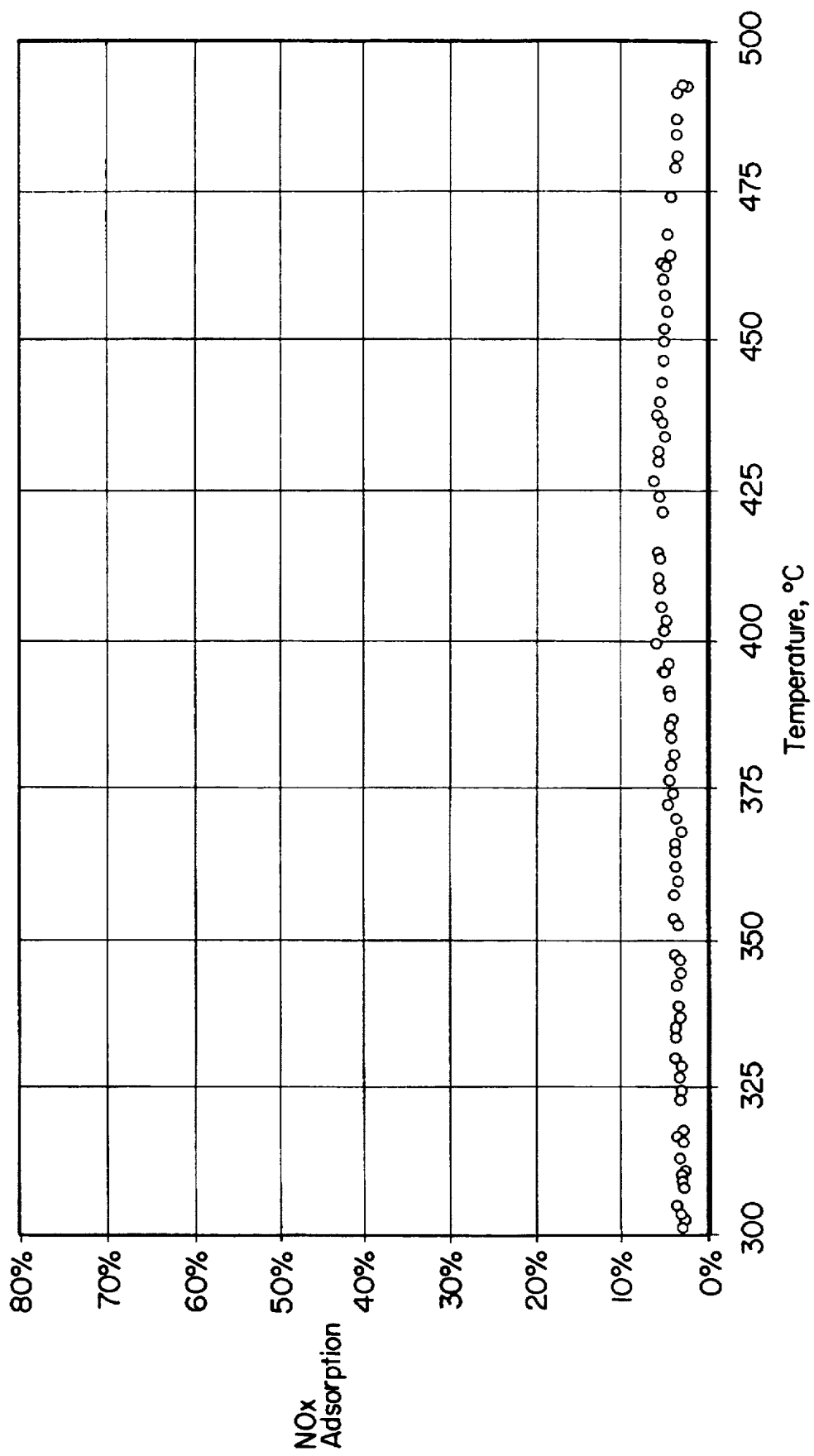

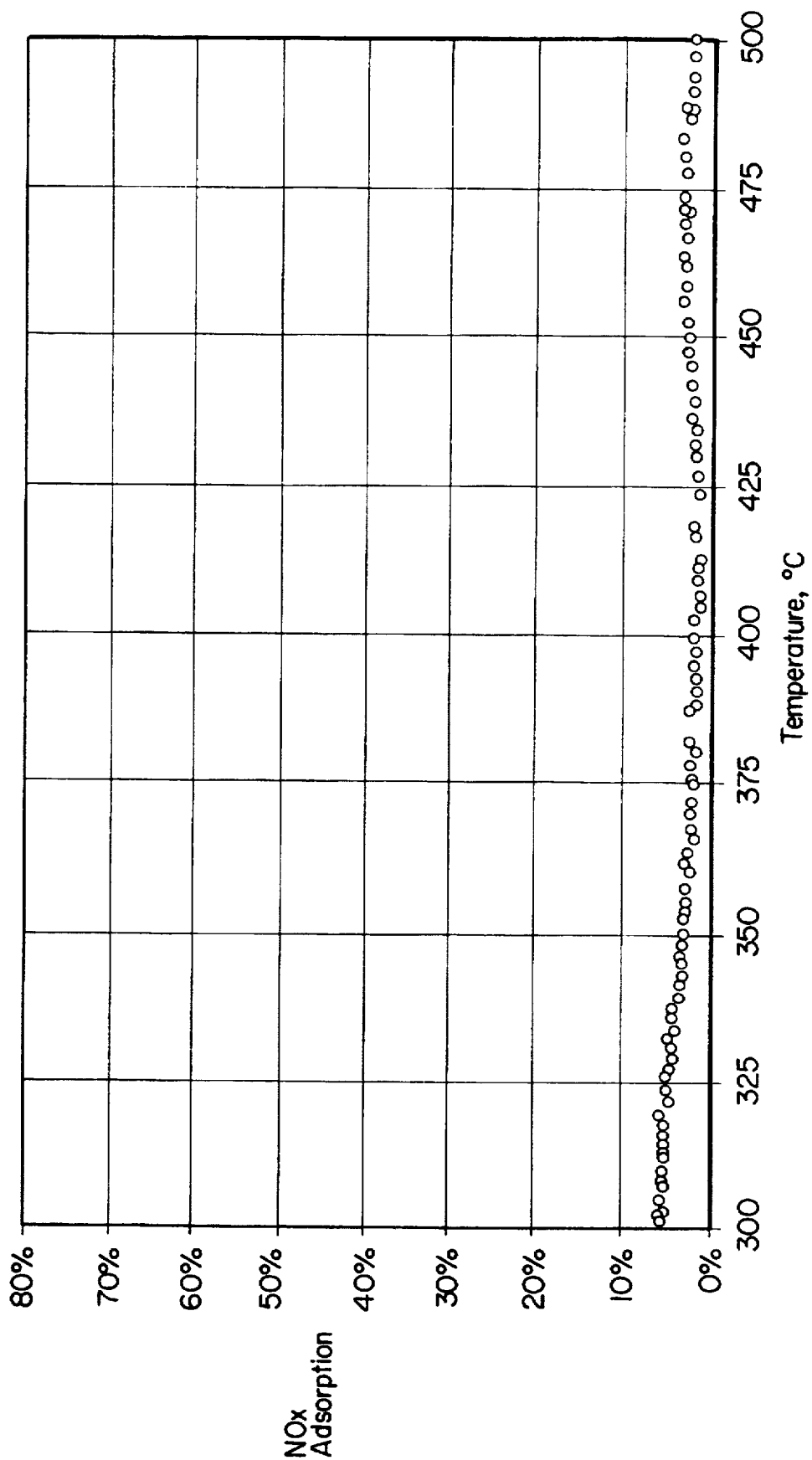

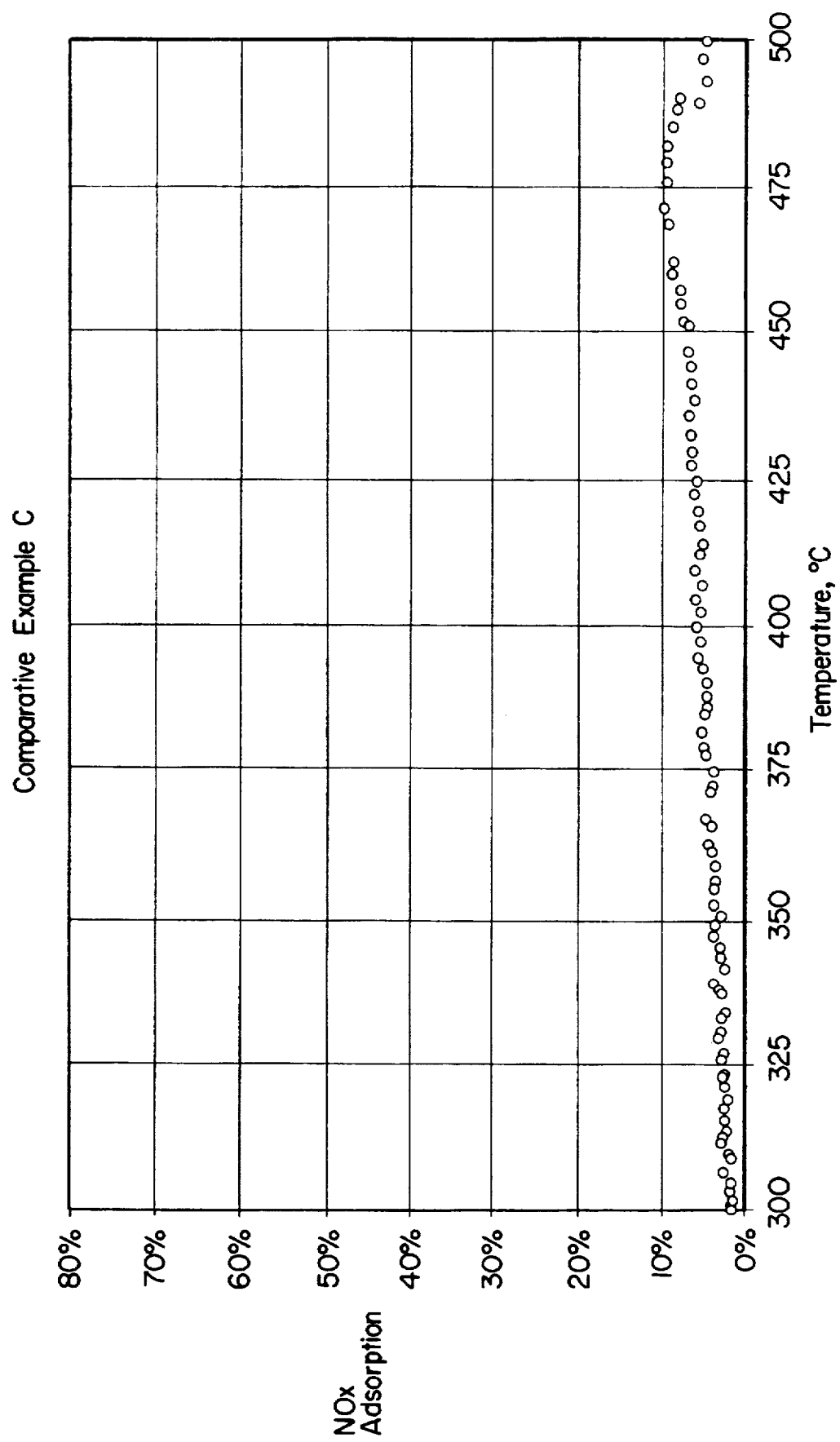

NITROGEN OXIDE ADSORBING MATERIAL

GOVERNMENT RIGHTS

The U.S. Government may have rights in this invention.

FIELD OF THE INVENTION

This invention relates to material that adsorbs nitrogen oxides from an oxidizing exhaust or effluent stream from a combustion process, such as from an internal combustion engine, and desorbs the adsorbed nitrogen oxides in a non-oxidizing atmosphere. The invention further relates to a substrate coated with the adsorbing material that can be placed in an oxidizing exhaust stream from a combustion process for removing the nitrogen oxides. The invention also provides an exhaust system comprising the material for adsorbing nitrogen oxides.

BACKGROUND OF THE INVENTION

Certain compounds in the exhaust stream of a combustion process, such as the exhaust stream from an internal combustion engine, are undesirable in that they must be controlled in order to meet government emissions regulations. Among the regulated compounds are nitrogen oxide compounds, or $NO_x$. There are a wide variety of combustion processes producing $NO_x$, for instance, coal- or oil-fired furnaces, reciprocating internal combustion engines (including gasoline and diesel engines), gas turbine engines, and so on. In each of these combustion processes, control measures to prevent or diminish atmospheric emissions of $NO_x$ are needed.

Industry has devoted considerable effort to reducing regulated emissions from the exhaust streams of combustion processes. In particular, it is now usual in the automotive industry to place a catalytic converter in the exhaust system of gasoline engines to remove undesirable emissions from the exhaust by chemical treatment. Typically, a "three-way" catalyst system of platinum, palladium, and rhodium metals dispersed on an oxide support is used to oxidize carbon monoxide and hydrocarbons to water and carbon dioxide and to reduce nitrogen oxides to nitrogen. The catalyst system is applied to a ceramic substrate such as beads, pellets, or a monolith. When used, beads are usually porous, ceramic spheres having the catalyst metal impregnated in an outer shell. The beads or pellets are of a suitable size and number in the catalytic converter in order to place an aggregate surface area in contact with the exhaust stream that is sufficient to treat the compounds of interest. When a monolith is used, it is usually a cordierite honeycomb monolith and may be precoated with γ-alumina and other specialty oxide materials to provide a durable, high surface area support phase for catalyst deposition. The honeycomb shape, used with the parallel channels running in the direction of the flow of the exhaust stream, both increases the surface area exposed to the exhaust stream and allows the exhaust stream to pass through the catalytic converter without creating undue back pressure that would interfere with operation of the engine.

When a gasoline engine is operating under stoichiometric conditions or nearly stoichiometric conditions with respect to the fuel:air ratio (just enough oxygen to completely combust the fuel, or perhaps up to 0.3% excess oxygen), a "three-way" catalyst has proven satisfactory for reducing emissions. Unburned fuel (hydrocarbons), $NO_x$, and oxygen are consumed in the catalytic converter, and the relatively small amount of excess oxygen does not interfere with the intended operation of the conventional catalyst system. The stoichiometric conditions or nearly stoichiometric conditions will be referred to as non-oxidizing conditions or as producing a non-oxidizing atmosphere.

However, it is desirable to operate the engine at times under lean burn conditions, with excess air, in order to improve fuel economy. While conventional non-oxidizing engine conditions might have a fuel:air ratio having 0.1–0.3% excess oxygen, a lean burn engine has a substantially greater excess of oxygen, from about 1% to perhaps up to 10% excess oxygen relative to the amount of fuel. Under lean burn conditions, conventional catalytic devices are not very effective for treating the $NO_x$ in the resulting oxygen-rich exhaust stream. Lean burn conditions will be referred to as oxidizing conditions or as producing an oxidizing atmosphere.

The exhaust stream from a diesel engine also has a substantial oxygen content, from perhaps about 2–18% oxygen. It is also believed that other combustion processes result in $NO_x$ emissions that are difficult or expensive to control because of, for instance, dilute concentrations of the nitrogen oxide compounds to be removed from the effluent stream or poor conversion of the compounds using conventional means.

In spite of efforts over the last decade to develop a catalytic converter effective for reducing $NO_x$ to nitrogen under oxidizing conditions in a gasoline engine or in a diesel engine, the need for improved conversion effectiveness has remained unsatisfied. Moreover, there is a continuing need for improved effectiveness in treating $NO_x$ emissions from any combustion process.

We have discovered an alternative way to treat the $NO_x$ emissions in an exhaust or effluent stream in which the $NO_x$ is adsorbed onto an adsorbent material for a period of time and then the $NO_x$ is desorbed at a time or under conditions appropriate for treating the $NO_x$. For example, the engine can be operated under lean-burn conditions for a significant fraction of time, during which the $NO_x$ is adsorbed from the oxidizing exhaust stream onto a surface of $NO_x$-adsorbent material. When the adsorbent surface is saturated or at a regular interval of time, the engine can be operated under stoichiometric or near stoichiometric conditions for a sufficient period of time for the adsorbed $NO_x$ to be desorbed and reduced to nitrogen in a non-oxidizing atmosphere. During the period when the engine is run at stoichiometric conditions, catalysts well-known to the industry could be used to effectively reduce the $NO_x$.

Some research has involved copper-exchanged zeolite materials or copper oxide calcined on alumina as adsorbers or reducers for $NO_x$. However, the zeolite materials are not hydrothermally stable, making them unsuitable for treating the exhaust of automotive engines. Moreover, the process of adsorbing $NO_x$ from an oxidizing atmosphere and desorbing $NO_x$ into a non-oxidizing atmosphere has not heretofore been known. This process provides important benefits, particularly for automotive applications.

We have further discovered a particular composition of an activated alkali metal-doped and copper-doped hydrous zirconium oxide, with the alkali metal being either sodium or potassium, and a substrate coated with the composition that are highly effective as adsorbents for $NO_x$ compounds. Unlike the zeolite materials mentioned, the sodium or potassium-doped and copper-doped hydrous zirconium oxide materials of the invention are hydrothermally stable in terms of chemical stability and retention of surface area and activity. Moreover, the inventive materials adsorb $NO_x$ in an oxidizing atmosphere and desorb $NO_x$ in a non-oxidizing atmosphere.

BRIEF DESCRIPTION OF THE DRAWINGS

FIGS. 1–2 illustrate preferred configurations for exhaust systems of the invention.

FIGS. 3–8 illustrate $NO_x$ adsorption test results for the materials of Examples 1–3 and Comparative Examples A–C.

SUMMARY OF THE INVENTION

According to the present invention, there is provided an activated sodium or potassium-doped and copper-doped hydrous zirconium oxide material that is a highly effective adsorbent for $NO_x$ in an oxidizing atmosphere, e.g., under lean burn conditions. The material comprises up to about 12% copper by weight and, preferably, at least about 1% sodium or potassium by weight. The material may also comprise silica for improved thermal stability, in a molar ratio of zirconium to silicon of from about 4 to about 6 moles zirconium to 1 mole silicon. When the material comprises at least about 7% silica, the sodium or potassium content is preferably at least about 3.5% of the material by weight. At lesser amounts of silica, correspondingly lesser amounts of sodium or potassium are required, down to at least about 1% sodium or potassium by weight being preferred when the material contains no silica.

The invention further provides a sodium or potassium-doped, copper-doped hydrous zirconium oxide material that includes an amount of silica effective to thermally stabilize the material for temperatures of up to about 1000° C.

The invention further provides a device for adsorbing $NO_x$ in the exhaust stream from a combustion process that has a substrate coated with the $NO_x$ adsorber material of the invention, and methods for making the device. The coated substrate is preferably ceramic beads or pellets, or a cordierite honeycomb monolith, especially a cordierite honeycomb monolith that has been precoated with γ-alumina. The device is especially useful in an automotive exhaust system for adsorbing the $NO_x$ emissions in an oxidizing exhaust stream. An exhaust system that provides for desorbing the $NO_x$ emissions in a non-oxidizing exhaust stream, as when the engine is operated under stoichiometric or nearly stoichiometric conditions, with a catalyst for chemically reducing $NO_x$ located either in the adsorbing device or downstream of the adsorbing device, is also provided. In particular, a three-way catalyst in, for example, a catalytic converter of the kind known to the art is contemplated.

The coated substrate may be prepared according to one of two methods. The first method is a direct coating method in which a precursor to the copper-doped hydrous zirconium oxide is coated onto the substrate, and further steps to synthesize the final activated adsorber compound are conducted after the coating step. The second method of coating a substrate with an activated copper-doped hydrous zirconium oxide material comprises the steps of preparing the copper-doped hydrous zirconium oxide material, forming an aqueous slurry of the material, coating the substrate with the material, and calcining the coated substrate.

The invention further encompasses a method of adsorbing $NO_x$ in an oxidizing atmosphere, e.g., while an engine is operating with a stoichiometric excess of air relative to fuel, and desorbing the adsorbed $NO_x$ with a non-oxidizing atmosphere, e.g., resulting from operating the engine under stoichiometric or nearly stoichiometric conditions.

DETAILED DESCRIPTION OF THE INVENTION

A unique and unexpected synergism exists between the copper, zirconium, and alkali metal (sodium or potassium) phases of the material of the invention that facilitates $NO_x$ adsorption. Both copper-doped hydrous zirconium oxide material and copper-doped hydrous zirconium oxide/silica materials exhibit similar threshold behavior for activation of the $NO_x$ adsorption, although the minimum amount of sodium or potassium necessary to observe this behavior differs for the two materials. For the zirconium oxide material, the sodium or potassium content is preferably about 1 wt. % or greater, while the zirconium oxide/silica material preferably includes a sodium or potassium content of about 3.5 wt. % or greater. All percentages are by weight, based on the weight of the final activated (calcined) Na—Cu—HZO or K—Cu—HZO compound or activated Na—Cu—HZO or K—Cu—HZO coated substrate, unless expressly stated otherwise. The combination of zirconium oxide, copper, and an alkali metal selected from sodium and potassium is critical. No appreciable $NO_x$ adsorption is observed for compounds with titanium oxide or other metal oxides, or for hydrous zirconium oxides doped with metals other than copper, or for copper-doped hydrous zirconium oxide materials that do not include sufficient sodium or potassium.

When the sodium or potassium-doped and copper-doped hydrous zirconium oxide (Na—Cu—HZO or K—Cu—HZO) materials of the invention are coated onto a substrate that is placed in the exhaust stream, oxygen must be present for the $NO_x$ adsorption to occur. A lack of oxygen causes the material to desorb the $NO_x$. Thus, when the engine exhaust stream is rich in oxygen, as during lean burn operation, the materials of the invention will adsorb $NO_x$ from the exhaust stream. When it is desired to desorb and reduce the adsorbed $NO_x$, the materials of the invention should be exposed to a non-oxidizing atmosphere, such as results when the engine should be operated under stoichiometric or nearly stoichiometric fuel:air ratios. Under stoichiometric conditions or near stoichiometric conditions, the fact that the exhaust stream has no or only a minor amount of oxygen causes the $NO_x$ to desorb from the Na—Cu—HZO or K—Cu—HZO material.

An important benefit to desorption of the $NO_x$ in a non-oxidizing atmosphere is that the $NO_x$ can be reduced to nitrogen by known methods. When the $NO_x$ is desorbed in a non-oxidizing atmosphere, it may then be catalytically reduced, for example by using conventional catalyst systems such as the three-way catalysts now used in automotive catalytic converters, which are known to be effective for that purpose under the desorbing stoichiometric conditions. The reducing catalyst may be in the same device as the substrate coated with the $NO_x$ adsorber materials of the invention, or the catalyst may be located in a downstream catalytic converter so that the exhaust stream carries the desorbed $NO_x$ into the downstream catalytic converter.

Preferably, the exhaust systems of the invention include means for controlling the atmosphere in the exhaust stream so that when the exhaust stream contacts the $NO_x$ adsorbing/desorbing materials of the invention the atmosphere can be varied from oxidizing to non-oxidizing. One means of control would be to cycle the air:fuel ratio in the combustion process from stoichiometric to excess air conditions at regular intervals or when the $NO_x$ adsorbing/desorbing materials become saturated with $NO_x$.

Referring now to the figures, FIG. 1 illustrates a preferred embodiment of the exhaust system of the invention wherein the $NO_x$ adsorption and conversion are carried out in the same device. The exhaust stream from the combustion engine or furnace 1 is carried by exhaust pipe 2 to the device of the invention 3. In this figure, the device 3 comprises both the adsorber material that adsorbs the $NO_x$ from the exhaust stream in an oxidizing atmosphere and the catalyst for reducing the $NO_x$ as it is desorbed in a non-oxidizing atmosphere. Controller 7 varies the atmosphere from oxidizing to non-oxidizing by cycling the air; fuel ratio in the combustion process from stoichiometric to excess air conditions. The rest of the exhaust stream, along with the conversion products in the non-oxidizing exhaust stream, passes through exhaust pipe 4 to exit the exhaust system.

FIG. 2 illustrates a preferred embodiment of the exhaust system of the invention wherein the $NO_x$ adsorption and conversion are carried out in the separate devices. As in FIG. 1, the exhaust stream from the combustion engine or furnace 1 is carried by exhaust pipe 2 to the device of the invention 3. The device 3 comprises, in this case, only the adsorber material that adsorbs the $NO_x$ from the exhaust stream in an oxidizing atmosphere and desorbs the $NO_x$ in a non-oxidizing atmosphere. Controller 7 varies the atmosphere from oxidizing to non-oxidizing by cycling the air; fuel ratio in the combustion process from stoichiometric to excess air conditions. When the $NO_x$ is desorbed in a non-oxidizing atmosphere, it is carried by the exhaust stream along exhaust pipe 4 to the catalytic converter 5, where it is reduced to nitrogen. It is preferred that the catalytic converter also have means to oxidize the hydrocarbon and carbon monoxide emissions from the combustion process. For example, the catalytic converter could employ the usual three-way catalyst system for this purpose. The exhaust stream then passes from the catalytic converter through exhaust pipe 6 to exit the exhaust system.

In general, the activated hydrous zirconium oxide material is prepared through the steps of forming an intermediate sol in a lower alcohol by the reaction of an alkali or alkaline earth metal hydroxide dissolved in the lower alcohol with a zirconium alkoxide. The alcohol used preferably has up to 8 carbon atoms, more preferably up to 4 carbon atoms, and it is particularly preferred to use methanol. The intermediate is then hydrolyzed to form a hydrous zirconium oxide containing the alkali or alkaline earth metal cation. An ion exchange of the hydrous zirconium oxide with the doping copper cation follows, and, finally, the doped material is calcined to activate the copper-doped hydrous zirconium oxide material. General preparative procedures for catalytic hydrous metal oxide materials are described in Dosch et al., U.S. Pat. No. 4,511,455, Dosch et al., U.S. Pat. No. 4,929,582, and Dosch et al., U.S. Pat. No. 5,461,022, the entire contents of all three patents now being incorporated herein by reference.

The activated copper-doped hydrous zirconium oxide material may be introduced onto a substrate, such as ceramic beads or a cordierite monolith optionally precoated with γ-alumina, by one of at least two methods. In the first method, hereinafter referred to as the powder slurry method, an aqueous slurry is made of a copper-doped hydrous zirconium oxide powder, and is contacted with the target substrate. The first method has the advantage of having the same steps for the manufacturer of ceramic substrates for automotive catalytic converters as methods already used in the industry. The disadvantage of the first method is that thicker films result.

For example, the beads or cordierite monolith, with or without the γ-alumina coating, can be coated by the powder slurry method by pouring an approximately 50% solids by weight slurry of the copper-doped hydrous zirconium oxide material onto the beads or into the channels of the monolith, pulling the slurry through to the other ends of the channel with vacuum at a rate chosen to deposit the desired thickness of coating. The applied coating is allowed to dry. Drying is preferably accomplished by heating the beads or monolith to about 100° C. under stagnant or forced air conditions. After drying, the applied coating is calcined, preferably by heating the coated substrate to between from about 300 to about 500° C., and particularly preferably at about 425° C., and holding at that temperature for up to 5 hours, preferably 1 hour, thereby producing an activated coated substrate.

In the second method, hereinafter referred to as the direct coating method, the target substrate is coated with the solution of the intermediate sol. After removal of excess sol, the sol-coated surface is hydrolyzed, preferably by exposure to atmospheric moisture, to form an ion exchangeable hydrous zirconium oxide coating. The steps of ion exchange and activation can then be performed to produce an activated copper-doped hydrous zirconium oxide material. The direct coating method is described in Dosch et al., U.S. Pat. No. 5,461,022, and reference is made thereto for further details. The coating deposited by the direct coating method is thinner than with the powder slurry method, resulting in use of a lesser amount of the expensive copper and zirconium alkoxides. The disadvantage of the direct coating method is that more process steps (and perhaps more time and equipment) would be required of the manufacturer of the beads or monoliths for catalytic converters.

In particular, the preparation of the preferred embodiments according to the present invention is as follows. All percentages are by weight, based on the weight of the final activated (calcined) Na—Cu—HZO or K—Cu—HZO compound or activated Na—Cu—HZO or K—Cu—HZO coated substrate, unless expressly stated otherwise. Zirconium ethoxide may be used as a starting material or may be formed in situ in ethanol by using a higher alkoxide. Useful zirconium alkoxides include those wherein each alkoxide ligand has up to 8, preferably up to 4, carbon atoms, for example, zirconium methoxide, zirconium ethoxide, zirconium n-propoxide, zirconium isopropoxide, zirconium n-butoxide, zirconium isobutoxide, zirconium sec-butoxide, and zirconium tert-butoxide. Further useful alkoxide compounds are listed in Dosch et al., U.S. Pat. No. 4,511,455 and Dosch et al., U.S. Pat. No. 5,461,022. The zirconium alkoxide may also have mixed ligands. The compounds with alkoxide ligands having three or four carbon atoms are preferred due to easier handling characteristics such as higher flash points and lower toxicity. The zirconium alkoxide is mixed with ethanol to form zirconium ethoxide, and then with a methanolic hydroxide solution to produce a hydrous zirconium oxide.

It is particularly preferred for some applications to include silicates, such as tetraalkylorthosilicates, in the synthesis of the hydrous zirconium oxide materials. When the activated Na—Cu—HZO or K—Cu—HZO material further includes silica, the material has greater thermal stability, being stable at temperatures of up to 1000° C. One preferred silicate is tetraethylorthosilicate. The silicate material is mixed with the zirconium alkoxide prior to the reaction with the alkali or alkaline earth metal hydroxide. While the theory of how the silica functions in the hydrous zirconium oxide material is unimportant to making and using the invention, it is believed that the presence of silica inhibits zirconium oxide particle growth and high temperature crystallization to prevent loss of surface area. This can be beneficial when the device is used for treating the exhaust stream from an automotive engine because of possible temperature spikes under certain conditions, such as engine misfire, at which times the device of the present invention might experience temperatures as high as 1000° C. for a brief period of time.

However, including the silica in the material decreases the maximum NO$_x$ adsorption capacity of the material slightly and increases the amount of sodium needed to obtain high NO$_x$ adsorption properties.

When silica is included, it may be included in a molar ratio of zirconium to silicon of from about 4:1 to about 6:1. A preferred ratio is 5 moles of zirconium to 1 mole of silicon. The tetraalkylorthosilicate is mixed with the zirconium alkoxide, then with ethanol to form zirconium ethoxide, and finally with a methanolic hydroxide solution to produce a co-network with silicon-oxygen, zirconium-oxygen, an silicon-oxygen-zirconium bonds.

The hydroxide used is preferably selected from alkali metal and alkaline earth metal hydroxides. Useful hydroxides include sodium hydroxide, potassium hydroxide, lithium hydroxide, ammonium hydroxide, tetramethyl ammonium hydroxide, barium hydroxide, calcium hydroxide, and strontium hydroxide. Sodium hydroxide and potassium hydroxide are particularly preferred. The alkali or alkaline earth metal hydroxide is dissolved in the methanol, preferably at approximately 10% by weight. The exact concentration is not critical, but an excess of the methanol helps to facilitate both the alcohol exchange reaction and the reaction between the zirconium alkoxide and tetraalkylorthosilicate, as well as enhance solubility of the intermediate. The zirconium alkoxide or alkoxide mixture is added to the alkali or alkaline earth metal solution in a molar ratio of about one mole of alkali or alkaline earth metal to from about 2 to about 10 moles, preferably from about 2 to about 3 moles, and particularly preferably about 2.0 moles total of zirconium and silicon. The addition is carried out at temperatures up to the boiling point of solution. The rate of addition is not critical. The alkoxides may be added slowly enough to prevent boiling, or, alternatively, the exotherm may be dissipated by cooling during the reaction, for example by placing the container holding the solution in a water bath, by use of a cooling jacket, or by making the addition in a reactor fitted with a reflux condenser. The reaction is facile and is complete or essentially complete after a couple of minutes with stirring.

The intermediate produced by this reaction is then hydrolyzed. The hydrolysis for the powder slurry method is generally effected by pouring the intermediate solution into water or a mixture of water with other ingredients. Preferably, the intermediate solution is poured into a mixture of water in acetone, for example a mixture of about 11% by weight water in acetone. While the particular ratio of water to acetone is not critical, there is preferably a sufficient amount of water to hydrolyze all of the intermediate that is added. Acetone is one preferred material to use with the water because it aids in the agglomeration of the product and is easily removed in a later drying step. The intermediate is added to the water or aqueous mixture with stirring. The hydrolysis to agglomerated alkali- or alkaline earth metal-doped hydrous zirconium oxide material is complete or essentially complete at room temperatures after a couple of minutes with stirring.

When the direct coating method is used, the substrate to be coated, such as beads or a cordierite monolith, is first soaked in an excess of the soluble intermediate for up to about 24 hours, taking care to remove any trapped air. The excess sol is removed by draining, inert gas purging, vacuum filtration, or other means. The coated material may be hydrolyzed by exposure to ambient moisture. The moisture content of ambient air is usually sufficient to hydrolyze the alkoxides present in the sol coating.

Following hydrolysis, the alkali or alkaline earth metal ions, or, if sodium or potassium, some or all of the sodium ions or potassium ions, are exchanged for the copper ions. At least for copper loadings of up to about 12% of the activated Na—Cu—HZO or K—Cu—HZO material by weight, a higher loading of copper results in increased NO$_x$ adsorption capacity. It is preferred to include up to about 12% of copper, based on the weight of the activated material. More preferably, from about 0.5% to about 8%, and even more preferably from about 1.5 to about 5% of the copper is included, based on the weight of the activated material or activated coated substrate. The maximum NO$_x$ adsorption versus % copper does not increase linearly, so that smaller increases in NO$_x$ adsorption are expected as the amount of included copper gets closer to the 12% at the upper end of the preferred range. These ranges and values apply regardless of whether the activated Na—Cu—HZO or K—Cu—HZO material further includes silica.

The copper is added as a cation. Practically any soluble copper salt can be used to supply the copper cation. Suitable compounds that can be used as the source of the copper include, for example, copper nitrate, copper sulfate, copper acetate, copper bromide, copper chloride, copper triflate, and similar compounds.

The copper can be added to the hydrous zirconium oxide material by dissolving the salt in water, adding the hydrous zirconium oxide material, and allowing a sufficient time, preferably at least about 30 minutes, for the desired extent of ion exchange. The pH is adjusted to a predetermined value and maintained at that value during the ion exchange step. The pH value is selected to avoid copper hydroxide precipitation and according to the amount of residual sodium desired at the end of the ion exchange step. The pH is preferably adjusted with mineral acids, such as hydrochloric acid or nitric acid, or with ammonium hydroxide.

It is necessary, in order to attain a high level of NO$_x$ adsorption, to retain or introduce after the ion exchange step at least some sodium or potassium in the hydrous zirconium oxide materials. The amount of sodium or potassium in the material can be monitored by atomic absorption spectrometry. Conducting the ion exchange step at basic pH results in materials with sodium or potassium content of from about 2 to about 8%. One preferred method is to employ a hexaaminecopper cation in the ion exchange at a high pH, preferably at a pH of from about 11 to about 13. The ion exchange under these conditions yields a residual sodium or potassium level sufficient for NO$_x$ adsorption if the hydrous zirconium oxide material does not include silica. If silica is included, at least some sodium or potassium will need to be added after the ion exchange step in order to obtain the maximum NO$_x$ adsorption capabilities for the material.

The level of sodium or potassium is increased after the ion exchange step, if desired, by an incipient wetness impregnation procedure. In such a procedure, the sodium or potassium is introduced by addition of an aqueous solution of a sodium or potassium cation. A convenient source of the sodium or potassium cation is aqueous sodium or potassium hydroxide, but other solutions with sodium or potassium cations, such as solutions of sodium or potassium nitrate may also be used. The anion of the salt is preferably easily removable by calcining. The sodium or potassium cation solution is mixed with the copper-doped hydrous zirconium oxide material, and the mixture is allowed to equilibrate. The time allowed for equilibration at room temperature is preferably at least eight hours. Following the equilibration, the sodium or potassium-doped material is dried.

Preferably, at least about 1% sodium or potassium is included in the activated Na—Cu—HZO or K—Cu—HZO material, and it is preferred to include sodium or potassium in the activated material at from about 1 to about 8%, and particularly preferably at from about 1 to about 4%, by weight, based on the final weight of the calcined material. Although 1% sodium or potassium is preferred, some $NO_x$ adsorption may be observed with lesser amounts of sodium or potassium, depending upon the particular material employed. One especially preferred embodiment is an activated hydrous zirconium oxide material that is from about 1.5 to about 5% by weight copper and from about 2 to about 3% by weight sodium or potassium. When the activated Na—Cu—HZO or K—Cu—HZO material also includes silica, preferably at least about 3.5% by weight sodium or potassium is included, and it is preferred to include sodium or potassium in the activated material at from about 3.5 to about 8%, and particularly preferably at from about 3.5 to about 5%, by weight. Another preferred embodiment is an activated hydrous zirconium oxide/silica material, with a Zr:Si ratio of about 5 moles Zr for each mole Si, having from about 1.5 to about 5% by weight copper and from about 3.5 to about 5% by weight sodium or potassium. At lesser amounts of silicon, correspondingly lesser amounts of sodium or potassium are required, down to at least about 1% sodium by weight being preferred when the material contains no silicon.

In the powder slurry method, after the ion exchange step, the reaction mixture is filtered using a Buchner funnel to recover the copper-doped product. The amount of copper ion uptake can be determined by atomic absorption spectrometry. The powder is ground, if necessary, to a −60/+80 mesh particle size range.

The powder or coated substrate is then calcined, for example by heating at about 600° C. for from about 1 to about 3 hours. The copper and the hydrous zirconium oxide are converted during the calcination to crystallized metal particles and metal oxide phases. The calcined material is what is referred to as the activated copper-doped hydrous zirconium oxide material.

As described above, the activated copper-doped hydrous zirconium oxide material is coated by either the powder slurry method or the direct coating method onto the substrate of a honeycomb monolith. The honeycomb monolith is preferably a ceramic honeycomb monolith of the type widely used for automotive catalytic converters. These monoliths are well-known in the art. Such monoliths are extruded from synthetic cordierite materials (ideally $Mg_2Al_4Si_5O_{18}$) according to well-known ceramic processes. Honeycomb cordierite monoliths are commercially available from Corning, Inc., Corning, N.Y.; and from NGK-Locke, Inc. The resulting cordierite monolith is a macroporous support for the catalysts that has sufficient channels to both permit the exhaust stream to pass at a rate sufficient to avoid an excessive amount of back pressure that would interfere with proper operation of the engine, and also provide an effective surface area to maximize exposure of the exhaust gases to the $NO_x$ reduction catalyst.

In a particularly preferred embodiment, the cordierite honeycomb monolith is first coated with a layer of γ-alumina. Monoliths with γ-alumina coatings are manufactured commercially for the automotive industry by various companies, such as Allied Signal, Des Plaines, Ill.; Englehard Corp., Jackson, Miss.;, Johnson Matthey, Wayne, Pa.; and Degussa Corp., Dublin, Ohio.

The effective amount of the activated copper-doped hydrous zirconium oxide depends upon the particular application, i.e., the geometry of the coated substrate, and can be optimized by straightforward testing.

The device of the invention, which comprises a substrate coated with the $NO_x$ adsorber material according to the methods described above, is positioned in an exhaust stream of a combustion process. The coated substrate of the device adsorbs $NO_x$ in an oxidizing atmosphere and desorbs $NO_x$ in a non-oxidizing atmosphere.

In an automotive application the device of the invention is placed in the automotive exhaust system after the engine and before the end of the tailpipe, so that the exhaust gases must pass through the device before being emitted to the atmosphere. When a $NO_x$ reducing catalyst or catalyst system are included in a separate catalytic converter, the device of the invention must be placed before the catalytic converter so that during the desorbing phase the exhaust stream will carry the desorbed $NO_x$ into the catalytic converter. If other methods of or equipment for destruction of the desorbed $NO_x$ are employed, the methods of using the present invention may be varied accordingly.

The invention is further described in the following examples. The examples are merely illustrative and do not in any way limit the scope of the invention as described and claimed.

PREPARATION 1

Preparation of Sodium-Doped Hydrous Zirconium Oxide/Silica Material

One mole (327.6 grams) of zirconium n-propoxide and 0.2 mole (41.7 grams) of tetraethylorthosilicate were mixed well in a glass beaker. This mixture was added to ethanol to form zirconium ethoxide (2:1 molar ratio of ethanol to propoxide ligands). The resulting solution was briefly boiled, then cooled to less than 50° C. A separate Teflon beaker was charged with 200 grams of a 10% by weight solution of sodium hydroxide in methanol (20 grams, 0.5 mole sodium hydroxide). The mixture of zirconium ethoxide and tetraethylorthosilicate was added to the methanolic NaOH slowly (to prevent boiling) with gentle stirring. The resulting solution of the intermediate was warm and clear. The intermediate was then hydrolyzed by pouring the methanol-intermediate solution slowly, with stirring, into a large Teflon beaker containing 1000 ml acetone and 100 ml deionized water. The slurry of the hydrolyzed material was stirred for approximately two minutes, then poured into a coarse porosity glass frit Buchner funnel and allowed to settle for a few minutes. Vacuum was applied to filter the slurry. The filter cake of product was rinsed with about 500 ml of acetone, divided into three portions. The product was dried under vacuum (about 3–5 in. Hg absolute pressure) overnight. The powder was passed through a #60 sieve, grinding larger pieces as necessary.

PREPARATION 2

Preparation of Sodium-Doped Hydrous Zirconium Oxide Material

The procedure for preparing sodium-doped hydrous zirconium oxide material was the same as for Procedure 1, except that no tetraethylorthosilicate was included.

METHOD OF EVALUATING THE MATERIALS

The materials prepared in the following examples and comparative examples were evaluated for $NO_x$ adsorption capabilities according to the following method.

Nominally 1 gram of the product material was heated to about 500° C. under nitrogen. A reactant gas containing 8% oxygen, 7% carbon dioxide, 7% water, 400 parts per million (ppm) by volume carbon monoxide, 133 ppm by volume hydrogen, 467 ppm by volume propylene, 233 ppm by volume propane, and 250 ppm by volume nitrogen oxide was introduced at a rate of 20 liters gas per hour per cubic centimeter of product material. A scan was conducted from 500° C. to 200° C. at a rate of decrease of 5° C./minute or less to produce a %$NO_x$ adsorption curve. A maximum in the adsorption curve is observed because of an increased ability to adsorb $NO_x$ as the temperature is lowered that is counterbalanced by increased loading of $NO_x$ on the surface.

EXAMPLE 1

Preparation of Activated Hydrous Zirconium Oxide/ Silica

Material Doped with 2.1 wt. % Copper and 5.5 wt. % Sodium 10.0 g of the sodium-doped hydrous zirconium oxide/ silica material of Preparation 1 was slurried in 50 ml of deionized water. The pH of the slurry was adjusted to 8 with 10 wt. % nitric acid. A solution of 0.62 gram of $Cu(NO_3)_2 \cdot 2.5H_2O$ in 50 ml deionized water was added to the slurry. The resulting mixture was stirred for 30 minutes, adding the nitric acid as necessary to keep the pH below 6.9. The slurry was filtered using a coarse porosity glass frit Buchner funnel. The collected solid material was rinsed with three 25-ml portions of deionized water, then rinsed with three 25-ml portions of acetone. The filter cake was broken up and vacuum pulled on the powder in the Buchner funnel for about an hour to dry the powder. The powder was then granulated to a −40/+60 mesh with light grinding. Mesh fractions that were too fine were pressed into small pellets using a pressure of 12 kpsi and reground to the desired mesh.

An incipient wetness impregnation procedure was used to add the sodium to the granulated copper-doped hydrous zirconium oxide/silica material. 3 grams of the granulated hydrous zirconium oxide material was spread on a tray. A total of 1.16 ml of an aqueous solution of 2.66 grams NaOH in 10 ml. was added dropwise to the material. The wet powder was briefly mixed with a spatula to ensure uniformity. Following mixing, the wet powder was placed in a sealed glass scintillation vial and allowed to equilibrate overnight at room temperature. After equilibration, the powder was dried for 2 hours in air at 100° C. Finally, the sodium-doped granulated material was heated to 600° C. at a rate of 5° C./min. and calcined at that temperature for two hours in stagnant air. The calcined material was sieved to −60/+80 mesh.

The prepared product was determined by atomic absorption spectrometry to have 2.10% Cu, 0.30% Na from the sodium hydroxide, and 5.25% Na by incipient wetness, all percentages by weight. The $NO_x$ adsorption curve is shown in FIG. 3.

EXAMPLE 2

Preparation of Activated Hydrous Zirconium Oxide Material

Doped with 2 wt. % Copper and 6 wt. % Sodium 10.0 grams of the sodium doped hydrous zirconium oxide material of Preparation 2 was slurried in 50 ml of deionized water. The pH of the slurry was adjusted to 8 with 10 wt. % nitric acid. A solution of 0.53 gram of $Cu(NO_3)_2 \cdot 2.5H_2O$ in 50 ml deionized water was added to the slurry. The resulting mixture was stirred for 30 minutes, adding the nitric acid as necessary to keep the pH below 6.9. The slurry was filtered using a coarse porosity glass frit Buchner funnel. The collected solid material was rinsed with three 25-ml portions of deionized water, then rinsed with three 25-ml portions of acetone. The filter cake was broken up and vacuum pulled on the powder in the Buchner funnel for about an hour to dry the powder. The powder was then granulated to a −40/+60 mesh with light grinding. Mesh fractions that were too fine were pressed into small pellets using a pressure of 12 kpsi and reground to the desired mesh.

An incipient wetness impregnation procedure was used to add the sodium to the granulated copper-doped hydrous zirconium oxide material. 3 grams of the granulated hydrous zirconium oxide material was spread on a tray, and 1.16 ml. of an aqueous solution of 2.66 grams NaOH in 10 ml. was added dropwise to the material. The wet powder was briefly mixed with a spatula to ensure uniformity. Following mixing, the wet powder was placed in a sealed glass scintillation vial and allowed to equilibrate overnight at room temperature. After equilibration, the powder was dried for 2 hours in air at 100° C. Finally, the sodium doped granulated material was heated to 600° C. at a rate of 5° C./min. and calcined at that temperature for two hours in stagnant air. The calcined material was sieved to −60/+80 mesh.

The prepared product was determined by atomic absorption spectrometry to have 1.97% Cu and 6.29% Na from the combination of residual sodium and the sodium added by incipient wetness, all percentages by weight. The $NO_x$ adsorption curve is shown in FIG. 4.

EXAMPLE 3

Preparation of Activated Hydrous Zirconium Oxide Material

Doped with 2 wt. % Copper and 3 wt. % Sodium

A solution of 0.53 gram $Cu(NO_3)_2 \cdot 2.5\ H_2O$ in 100 ml deionized water was adjusted to pH 10 using 35 wt. % $NH_4OH$. As the pH increased, a light blue copper hydroxide precipitate was observed, which redissolved at higher pH to form a clear, bright blue solution. A 10-gram portion of the sodium doped hydrous zirconium oxide material from Preparation 2 was added to the copper solution and mixed for 30 minutes. The slurry was filtered using a coarse porosity glass frit Buchner funnel. The collected solid material was rinsed with three 25 -ml portions of deionized water, then rinsed with three 25 -ml portions of acetone. The filter cake was broken up and vacuum pulled on the powder in the Buchner funnel for about an hour to dry the powder. The powder was then granulated to a −40/+60 mesh with light grinding. Mesh fractions that were too fine were pressed into small pellets using a pressure of 12 kpsi and reground to the desired mesh. Finally, the granulated sodium-doped and copper-doped hydrous zirconium oxide material was heated to 600° C. at a heating rate of 5° C./minute and calcined at that temperature for 2 hours in stagnant air. The calcined material was sieved to −60/+80 mesh.

The prepared product was determined by atomic absorption spectrometry to have 2.10% Cu and 2.78% Na, all percentages by weight. The $NO_x$ adsorption curve is shown in FIG. 5.

PREPARATION A

Preparation of Sodium Doped Hydrous Titanium Oxide/Silica

Material

One mole (284.3 grams) of titanium isopropoxide and 0.2 mole (41.7 grams) of tetraethylorthosilicate were mixed well in a Teflon beaker. A separate Teflon beaker was charged with 200 grams of a 10% by weight solution of sodium hydroxide in methanol (20 grams, 0.5 mole sodium hydroxide). The mixture of titanium isopropoxide and tetraethylortho-silicate was added to the methanolic NaOH slowly (to prevent boiling) with gentle stirring. The resulting solution of the intermediate was warm and clear. The intermediate was then hydrolyzed by pouring the methanol-intermediate solution slowly, with stirring, into a large Teflon beaker containing 1000 ml acetone and 100 ml deionized water. The slurry of the hydrolyzed material was stirred for approximately two minutes, then poured into a coarse porosity glass frit Buchner funnel and allowed to settle for a few minutes. Vacuum was applied to filter the slurry. The filter cake of product was rinsed with about 500 ml of acetone, divided into three portions. The product was dried under vacuum (about 3–5 in. Hg absolute pressure) overnight. The powder was passed through a #60 sieve, grinding larger pieces as necessary.

COMPARATIVE EXAMPLE A

Preparation of Activated Hydrous Titanium Oxide/ Silica

Material Doped with 2.2 wt. % Copper and 5.5 wt. % Sodium

An activated copper- and sodium-doped hydrous titanium oxide/silica material was prepared according to the method of Example 1 by replacing the sodium-doped hydrous zirconium oxide/silica material of Preparation 1 with 10.0 grams of a sodium-doped hydrous titanium oxide/silica material prepared according to Preparation A.

The prepared product was determined by atomic absorption spectrometry to have 2.20% Cu, 0.30% Na from the sodium hydroxide, and 5.25% Na by incipient wetness, all percentages by weight. The $NO_x$ adsorption curve is shown in FIG. 6.

COMPARATIVE EXAMPLE B

Preparation of Activated Hydrous Zirconium Oxide/ Silica

Material Doped with 2.2 wt. % Copper and Without Sodium 10.0 g of the sodium-doped hydrous zirconium oxide/silica material of Preparation 1 was slurried in 50 ml of deionized water. The pH of the slurry was adjusted to 8 with 10 wt. % nitric acid. A solution of 0.62 gram of $Cu(NO_3)_2 \cdot 2.5H_2O$ in 50 ml deionized water was added to the slurry. The resulting mixture was stirred for 30 minutes, adding the nitric acid as necessary to keep the pH below 6.9. The slurry was filtered using a coarse porosity glass frit Buchner funnel. The collected solid material was rinsed with three 25-ml portions of deionized water, then rinsed with three 25-ml portions of acetone. The filter cake was broken up and vacuum pulled on the powder in the Buchner funnel for about an hour to dry the powder. The powder was then granulated to a −40/+60 mesh with light grinding. Mesh fractions that were too fine were pressed into small pellets using a pressure of 12 kpsi and reground to the desired mesh.

Finally, the granulated material was heated to 600° C. at a rate of 5° C./min. and calcined at that temperature for two hours in stagnant air. The calcined material was sieved to −60/+80 mesh.

The prepared product was determined by atomic absorption spectrometry to have 2.20% Cu. The $NO_x$ adsorption curve is shown in FIG. 7.

COMPARATIVE EXAMPLE C

Preparation of Activated Hydrous Zirconium Oxide/ Silica

Material Doped with 2.2 wt. % Nickel and 5.5 wt. % Sodium

An activated nickel- and sodium-doped hydrous zirconium oxide/silica material was prepared according to the method of Example 1 by replacing the $Cu(NO_3)_2 \cdot 2.5H_2O$ of Preparation 1 with 0.72 grams of a $Ni(NO_3)_2 \cdot 6H_2O$.

The prepared product was determined by atomic absorption spectrometry to have 2.20% Ni, 0.30% Na from the sodium hydroxide, and 5.25% Na by incipient wetness, all percentages by weight. The $NO_x$ adsorption curve is shown in FIG. 8.

We claim:

1. A $NO_x$ adsorber material, comprising an activated alkali metal-doped and copper-doped hydrous zirconium oxide material that adsorbs $NO_x$ in an oxidizing atmosphere and desorbs $NO_x$ in a non-oxidizing atmosphere, wherein the alkali metal is selected from the group consisting of sodium and potassium.

2. A material according to claim 1, wherein the alkali metal comprises sodium and further wherein the hydrous zirconium oxide material comprises at least about 1% sodium by weight and at least about 0.5% copper by weight.

3. A material according to claim 1, wherein the alkali metal comprises sodium and further wherein the hydrous zirconium oxide material comprises from about 1% to about 8% sodium by weight and from about 1.5% to about 5% copper by weight.

4. A material according to claim 1, wherein the hydrous zirconium oxide material further comprises silica.

5. A material according to claim 1 that further includes an amount of silica effective to thermally stabilize the material for temperatures of up to about 1000° C.

6. A material according to claim 1, wherein the hydrous zirconium oxide material further comprises silica in an amount that provides a zirconium to silicon molar ratio of at least about 4:1.

7. A material according to claim 6, wherein the molar ratio of zirconium to silicon is from about 4 to about 6 moles zirconium to 1 mole silicon.

8. A material according to claim 7, wherein the hydrous zirconium oxide material comprises from about 1% to about 8% sodium by weight and from about 0.5% to about 12% copper by weight.

9. A method of increasing $NO_x$ adsorption in a copper-doped hydrous zirconium oxide material, comprising doping the copper-doped hydrous zirconium oxide material with an alkali metal selected from the group consisting of sodium and potassium, wherein said material adsorbs $NO_x$ in an oxidizing atmosphere and desorbs $NO_x$ in a non-oxidizing atmosphere.

10. A coated substrate, comprising a coating on a substrate, wherein the coating comprises activated alkali metal-doped and copper-doped hydrous zirconium oxide that adsorbs $NO_x$ in an oxidizing atmosphere and desorbs $NO_x$ in a non-oxidizing atmosphere, wherein the alkali metal is selected from the group consisting of sodium and potassium.

11. The coated substrate according to claim 10, wherein the substrate is selected from the group consisting of a monolith and ceramic beads.

12. The coated substrate according to claim 11, wherein the substrate is precoated with a layer of γ-alumina.

13. A device for adsorbing $NO_x$ in an exhaust stream from a combustion process, comprising a coated substrate according to claim 10.

14. A combustion apparatus, comprising an exhaust system for combustion products, said system comprising a material that adsorbs $NO_x$, in an oxidizing atmosphere and desorbs $NO_x$, in a non-oxidizing atmosphere; and means for directing an exhaust stream of said combustion products into contact with said material, wherein said material is selected from the group consisting of sodium-doped and copper-doped hydrous zirconium oxide, potassium-doped and copper-doped hydrous zirconium oxide, and mixtures thereof.

15. A combustion apparatus according to claim 14, in which said exhaust stream provides an atmosphere in said exhaust system, and said exhaust system further includes means for varying the atmosphere in the exhaust stream from oxidizing to non-oxidizing.

16. A combustion apparatus according to claim 15, wherein the means for varying the atmosphere in the exhaust stream comprises a means of controlling a ratio of fuel to air in forming said combustion products.

17. A combustion apparatus according to claim 16, wherein the exhaust system further comprises a catalyst for reducing $NO_x$ located downstream of the material capable of adsorbing and desorbing $NO_x$.

18. An automotive exhaust emission control system, comprising:
(a) an exhaust system comprising a substrate coated with an activated alkali metal-doped and copper-doped hydrous zirconium oxide material, wherein the alkali metal is selected from the group consisting of sodium, potassium; and mixtures thereof;
(b) a catalyst disposed downstream from said substrate in said exhaust system for $NO_x$ conversion; and
(c) means for varying atmosphere in the exhaust stream from oxidizing to nonoxidizing.

19. An automotive exhaust emission control system according to claim 18, wherein said exhaust system includes a three-way catalyst comprising platinum, palladium, and rhodium metals.

20. An automotive exhaust emission control system according to claim 19, wherein the activated alkali metal-doped and copper-doped hydrous zirconium oxide material further comprises silica and further wherein the substrate is selected from the group consisting of a monolith and ceramic beads.

21. A method of removing $NO_x$ from an exhaust stream of a combustion process, comprising the steps of:
(a) providing a substrate coated with an activated alkali metal-doped and copper-doped hydrous zirconium oxide material, wherein the alkali metal is selected from the group consisting of sodium and potassium;
(b) providing an exhaust gas stream having an oxidizing atmosphere; and
(c) contacting said substrate with said stream to allow said substrate to adsorb $NO_x$ from said stream.

22. A method according to claim 21, further comprising additional steps of:
(d) changing the atmosphere of the exhaust gas stream from oxidizing to non-oxidizing,
(e) desorbing the adsorbed $NO_x$ from said substrate by contacting the substrate with the exhaust stream having the non-oxidizing atmosphere, and
(f) catalytically reducing the desorbed $NO_x$ to nitrogen.

23. The method according to claim 22, wherein the atmosphere of said exhaust gas stream is changed from oxidizing to non-oxidizing by changing a ratio of fuel to air being combusted to form said exhaust gas stream.

24. A method of making a substrate that adsorbs $NO_x$ in an oxidizing atmosphere and desorbs $NO_x$ in a non-oxidizing atmosphere, comprising the steps of:
(a) contacting the substrate with an aqueous slurry of a $NO_x$ adsorber/desorber material to form a coating of the $NO_x$ adsorber/desorber material on the substrate, and
(b) drying the coating, in which:
the substrate is contacted by depositing a coating of alkali metal-doped hydrous zirconium oxide material on the substrate, wherein the alkali metal is selected from the group consisting of sodium and potassium;
performing an ion exchange of the alkali metal with copper to form an alkali metal-doped and copper-doped hydrous zirconium oxide material;
calcining the alkali metal-doped and copper-doped hydrous zirconium oxide material.

25. A method according to claim 24, further comprising the following step between the ion exchange step and the calcining step:
(b1) performing an incipient wetness alkali metal impregnation on the copper-doped material to increase alkali metal content of the material, wherein the alkali metal used is selected from the group consisting of sodium and potassium.

\* \* \* \* \*